United States Patent
Ni et al.

(10) Patent No.: US 9,020,862 B2
(45) Date of Patent: Apr. 28, 2015

(54) METHOD AND SYSTEM FOR COMPUTER QUESTION-ANSWERING

(75) Inventors: Yuan Ni, Shanghai (CN); Zhao Ming Qiu, Beijing (CN); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/552,998

(22) Filed: Jul. 19, 2012

(65) Prior Publication Data

US 2013/0029307 A1 Jan. 31, 2013

(30) Foreign Application Priority Data

Jul. 29, 2011 (CN) .......................... 2011 1 0215092

(51) Int. Cl.
*G06F 15/18* (2006.01)
*G06N 99/00* (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS

| 7,418,443 | B2 | 8/2008 | Yoshimura et al. |
| 7,444,279 | B2 | 10/2008 | Murata |
| 7,593,934 | B2 | 9/2009 | Li et al. |
| 8,510,296 | B2 * | 8/2013 | Fan et al. ..................... 707/728 |
| 2007/0067293 | A1 * | 3/2007 | Yu ..................................... 707/7 |
| 2007/0136246 | A1 | 6/2007 | Stenchikova et al. |
| 2007/0203863 | A1 | 8/2007 | Gupta et al. |
| 2008/0201132 | A1 | 8/2008 | Brown et al. |
| 2009/0070311 | A1 | 3/2009 | Feng |
| 2009/0287678 | A1 | 11/2009 | Brown et al. |

FOREIGN PATENT DOCUMENTS

| CN | 1902647 A | 1/2007 |
| CN | 101872349 A | 10/2010 |

OTHER PUBLICATIONS

Deploying Semantic Resources for Open Domain Question Answering Nico Schlaefer Diploma Thesis—Jun. 2007.*
Efficient Location Extraction Algorithm by Leveraging Web Contextual Information Teng Qin, Rong Xiao, Lei Fang—Nov. 2-5, 2010.*

(Continued)

*Primary Examiner* — Kakali Chaki
*Assistant Examiner* — Ababacar Seck
(74) *Attorney, Agent, or Firm* — Francis Lammes; Stephen J. Walder, Jr.; Jeff Tang

(57) ABSTRACT

A method and system for computer question-answering. The method includes: receiving a plurality of the questions to be trained, and obtaining a candidate answer set for each question; determining part of the questions to which the candidate answer sets include correct answers, and using first feature sets of the candidate; obtaining a first mathematical model, which is used to compute a first confidence degree that the candidate answer is a correct answer; computing first confidence degrees of the candidate answers of all the questions to be trained, and for each question, extracting a second feature set related to the first confidence degrees and the first feature set; and obtaining a second mathematic model, which is used to compute a second confidence degree that the candidate answer is a correct answer based on the second feature set.

12 Claims, 3 Drawing Sheets

(56) References Cited

OTHER PUBLICATIONS

Ferrucci, et al., Building Watson:An Overview of the DeepQA Project, Association for the Advancement of Artificial Intelligence, Fall 2010, pp. 59-79.

Khalid, et al., Machine Learning for Question Answering from Tabular Data, Database and Expert Systems Applications, 18th International Workshop, Sep. 2007, pp. 392-396.

Wang, Hao-Chang et al., "Meta-learning based classifier ensemble strategy and its application", Journal on Communications, vol. 28, No. 10, Oct. 2007, 7 pages.

* cited by examiner

METHOD AND SYSTEM FOR COMPUTER QUESTION-ANSWERING

CROSS REFERENCE TO RELATED APPLICATION

This application claims priority under 35 U.S.C. 119 from Chinese Application 201110215092.1, filed Jul. 29, 2011, the entire contents of which are incorporated herein by reference.

BACKGROUND OF THE INVENTION

1. Field of the Invention

The present invention relates to the field of computer question-answering, and in particular to an improved computer learning method and system for computer question-answering, and a method and system for responding to a new question.

2. Description of the Related Art

A question-answering system, also referred to as Human Machine Conversation (HMC) system, refers to a system that receives from a user a question expressed in the form of a natural language, and obtains, from a large amount of structural, semi-structural or non-structural data, an accurate, concise and individualized answer to the question in the form of the natural language.

Question answer systems are playing an increasingly important role in various fields, such as assisting in diagnosis, self-medicating, in the health care/life science field, used in call centers, self-services, in the retailing/consumption field, assisting enterprises' decisions in the field of enterprise business intelligence, and many others.

However, in the prior art, when a correct answer is not included in the candidate answer set, since the data is not related to the machine learning, no matter how the model is trained, a correct answer to the question cannot be found, and the machine learning cannot achieve a good resolution. Thus, it can be seen that there is still room for improvement in the question-answering method and systems known in the prior art.

BRIEF SUMMARY OF THE INVENTION

In order to overcome these deficiencies, the present invention provides a machine learning method for computer question-answering, including: receiving a plurality of questions to be trained, and obtaining a candidate answer set for each of the questions; determining a part of the questions to which the candidate answer sets include correct answers, and using first feature sets of the candidate answers to which the part of the questions correspond to form a first input training data set; performing machine learning on the first input training data set to obtain a first mathematical model, and using the first mathematical model to compute a first confidence degree that the candidate answer is a correct answer based on the first feature set; computing first confidence degrees of the candidate answers of all of the questions to be trained, and for each question, extracting a second feature set related to the first confidence degrees and the first feature set; and performing machine learning on a second input training data set formed by the second feature sets of the plurality of questions to be trained, to obtain a second mathematic model, and using the second mathematical model to compute a second confidence degree that the candidate answer is a correct answer based on the second feature set.

According to another aspect, the present invention provides a method for responding to a new question, including: receiving a new question, and obtaining a candidate answer set to the new question; determining a part of the new question to which the candidate answer set includes correct answers, and using first feature sets of the candidate answers to which the part of the questions correspond to form a first input training data set; performing machine learning on the first input training data set to obtain a first mathematical model, and using the first mathematical model to compute a first confidence degree that the candidate answer is a correct answer based on the first feature set; computing first confidence degrees of the candidate answer of the new question, and for the new question, extracting a second feature set related to the first confidence degree and the first feature set; performing machine learning on a second input training data set formed by the second feature set of the new question, to obtain a second mathematical model, and using the second mathematical model to compute a second confidence degree that the candidate answer is a correct answer based on the second feature set; and responding to the new question according to the second confidence degree of the candidate answers to the new question.

According to yet another aspect, the present invention provides a machine learning system for computer question-answering, including: means configured to receive a plurality of questions to be trained, and obtain a candidate answer set for each question; means configured to determine a part of the questions to which the candidate answer sets include correct answers, and use first feature sets of the candidate answers to which the part of the questions correspond to form a first input training data set; means configured to perform machine learning on the first input training data set to obtain a first mathematical model, and use the first mathematical model to compute a first confidence degree that the candidate answer is a correct answer based on the first feature set; means configured to compute first confidence degrees of the candidate answers of all of the questions to be trained, and for each question, extracting a second feature set related to the first confidence degrees and the first feature set; and means configured to perform machine learning on a second input training data set formed by the second feature sets of the plurality of questions to be trained, to obtain a second mathematic model, which is used to compute a second confidence degree that the candidate answer is a correct answer based on the second feature set.

According to still yet another aspect, the present invention provides a system for responding to a new question, including: means configured to receive a new question, and obtain a candidate answer set to the new question; means configured to determine a part of the new question to which the candidate answer set includes correct answers, and use a first feature set of the candidate answers to which the part of the new question corresponds to form a first input training data set; means configured to perform machine learning on the first input training data set to obtain a first mathematical model, and use the first mathematical model to compute a first confidence degree that the candidate answer is a correct answer based on the first feature set; means configured to compute first confidence degrees of the candidate answers of all the new question, and for the new question, extracting a second feature set related to the first confidence degrees and the first feature set; means configured to perform machine learning on a second input training data set formed by the second feature sets of the new question, to obtain a second mathematical model, which is used to compute a second confidence degree that the candidate answer is a correct answer based on the second feature set; and means configured to respond to the new question according to the second confidence degree of the candidate answers to the new question.

BRIEF DESCRIPTION OF THE SEVERAL VIEWS OF THE DRAWINGS

The appended claims set forth the inventive features considered characteristic of the present invention, however, the invention itself, and preferred use mode, objectives, features and advantages thereof can be better understood by referring to the following detailed description when read in conjunction with the accompanying drawings, in which:

DETAILED DESCRIPTION OF THE PREFERRED EMBODIMENTS

Figure 1:
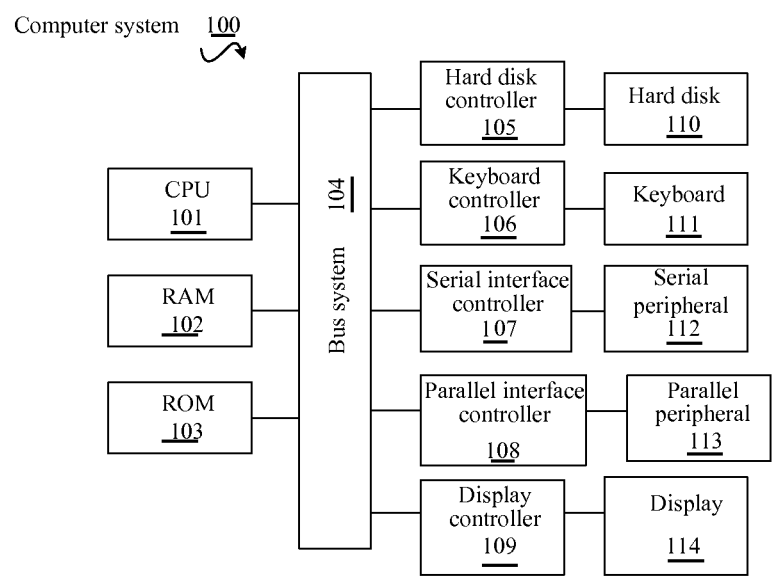
FIG. 1 illustrates a schematic computing system for realizing an implementation of the present invention.

Those skilled in the art will appreciate that the present invention can be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention can take the form of a computer program product embodied in a medium of expression having computer readable non-transient program code embodied thereon.

Any combination of one or more computer-readable medium(s) can be utilized. The computer-readable medium can be a computer readable signal medium or a computer readable storage medium. The computer readable storage medium can be, for example but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read only memory (ROM), an erasable programmable read-only memory (EPROM or Flash memory), an optical fiber, a portable compact disc read-only memory (CDROM), an optical storage device, a magnetic storage device, or any appropriate combination of the foregoing. In the context of this document, the computer-readable storage medium can be any tangible medium that can contain or store a program for use by or in connection with an instruction execution system, apparatus, or device.

The computer readable signal medium may include a propagated data signal with the computer-usable program code embodied therewith, either in baseband or as part of a carrier wave. Such a propagated data signal may take any appropriate form, including, but not limited to electromagnetic, optical, or any appropriate combination thereof. The computer readable signal medium can be any computer readable medium, different from the computer readable storage medium, that can communicate, propagate or transmit a program for use by or in connection with an instruction execution system, apparatus or device.

The program code embodied in the computer readable medium can be transmitted using any appropriate medium, including but not limited to wireless, wireline, optical fiber cable, RF, etc, or any appropriate combination of the foregoing.

Computer non-transient program code for carrying out operations in embodiments of the present invention can be written in any combination of one or more programming languages, including an object oriented programming language such as Java, Smalltalk, C++ or the like and conventional procedural programming languages, such as the "C" programming language or similar programming languages. The non-transient program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In the following, the present invention is described with reference to flowchart illustrations and/or block diagrams. It is to be noted that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Now referring to FIG. 1, it illustrates a schematic block diagram of a computing system 100 suitable for realizing an implementation of the present invention. As shown, the computing system 100 can include: a CPU (central processing unit) 101, a RAM (random access memory) 102, a ROM (read-only memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113 and a display 114. In these devices, the CPU 101, RAM 102, ROM 103, hard disk controller 105, keyboard controller 106, serial controller 107, parallel controller 108 and display controller 109 are coupled to the system bus 104. The hard disk 110 is coupled to the hard disk controller 105, the keyboard 111 is coupled to the keyboard controller 106, the serial peripheral device 112 is coupled to the serial interface controller 107, the parallel peripheral device 113 is coupled to the parallel interface controller 108, and the display device 114 is coupled to the display controller 109. It is to be appreciated that the structural block diagram shown in FIG. 1 is only presented for the purpose of illustration, rather than limitation to the present invention. In some cases, some devices can be added or removed according to specific conditions.

Figure 2:
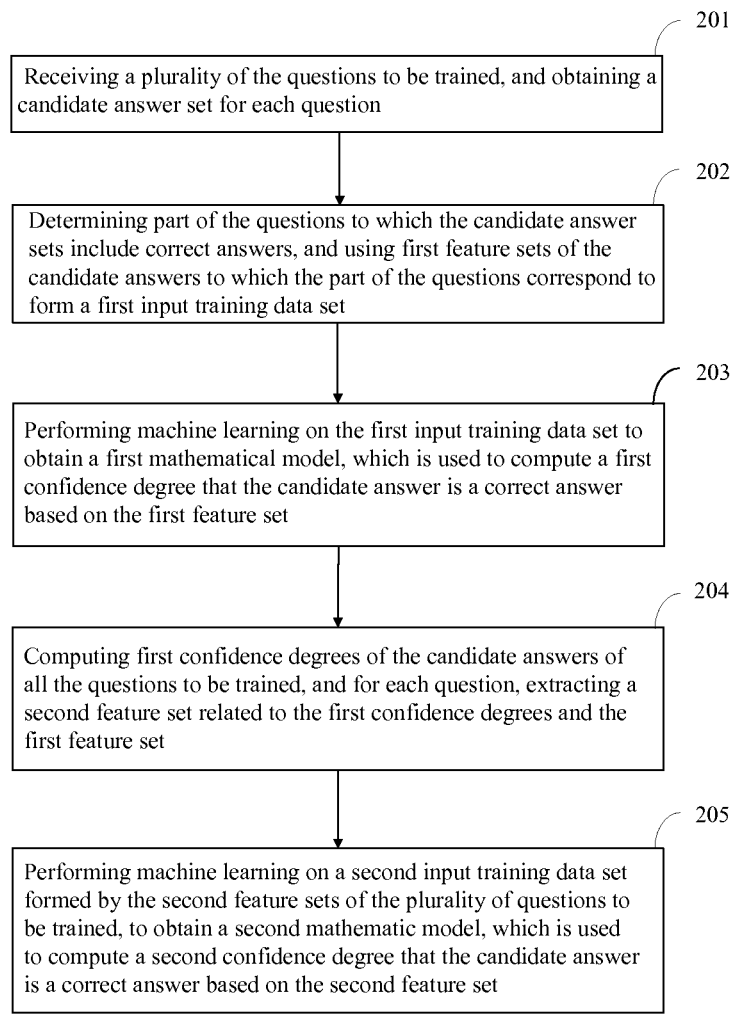
FIG. 2 illustrates a schematic flow diagram of a machine learning method of the present invention.

Now referring to FIG. 2, a flow diagram of machine learning used in a question-answering system is illustrated, including:

In step 201, receiving a plurality of the questions to be trained, and obtaining a candidate answer set for each question.

For each question to be trained, an existing candidate answer generation algorithm can be used to generate the candidate answer set for the question, the candidate answer set including at least one candidate answer. In an embodiment, a keyword is extracted from the question and is used to search a relevant document, then a paragraph closest to the question is looked up in the document, and further name entities in the paragraph are identified as the candidate answers.

Step 202 includes determining part of the questions to which the candidate answer sets include correct answers, and using first feature sets of the candidate answers to which the part of the questions correspond to form a first input training data set.

In an embodiment, the plurality of questions to be trained can be divided into two question groups, G1 and G2, wherein the candidate answer sets for G1 include correct answers, and wherein the candidate answer sets for G2 does not include correct answers. In this embodiment, by determining the G1 group, the part of the questions to which the candidate answer sets include correct answers is determined. G2 can be selected as the questions that are difficult to be answered. However, those skilled in the art will understand that in this step, it is only necessary to determine the part of the questions to which candidate answer sets include correct answers, and it is not necessary to determine the second question group.

TABLE 1

| | $q\_1$ | $f\_1$ | $f\_2$ | ... | $f\_m$ | |
|---|---|---|---|---|---|---|
| Candidate answer set | $c\_1$ | 0.1 | 0.2 | ... | 0.3 | ⇐ Candidate answer $c\_1$ |
| | $c\_2$ | 0.8 | 0.7 | ... | 0.5 | ⇐ Candidate answer $c\_2$ |
| | ... | ... | ... | ... | ... | |
| | $c\_n$ | 0.4 | 0.2 | ... | 0.2 | ⇐ Candidate answer $c\_n$ |

In order to illustrate the relationships between questions, candidate answer sets and the first feature sets, reference can be made to Table 1, wherein, the candidate answer set to which the question $q\_1$ corresponds include n candidate answers ($c\_1, c\_2 \ldots c\_n$), and the first feature set of each candidate answer include m first features ($f\_1, f\_2 \ldots f\_m$). Therefore, each row in FIG. 1 represents a candidate answer and a corresponding first feature set (F1), that is, the first feature sets and the candidate answer sets have a one-to-one correspondence relationship therebetween.

In an embodiment, the first features in the first feature set (F1) is one or more features selected from common features for determining whether a candidate answer is a correct answer in an existing question-answering system, such as:

F10: the matching degree of the type of the candidate answer and the question to be trained;

F11: the literal similarity between the text around the candidate answer and the text of the question to be trained;

F12: the similarity score of the candidate answer obtained in the searching results;

F13: the matching degree of the time feature of the candidate answer and the time appearing in the question to be trained;

F14: the matching degree of the geographic location of the candidate answer and the geographic location appearing in the question to be trained.

Referring to the last column of table 2, the first feature set may further include information about whether the candidate answer is correct.

In the training phase, G1 can include a large number of questions to be trained, and the first feature sets of the candidate answers of all the questions to be trained in G1 form a first input training data set (D1) of the machine learning algorithm, with each instance in D1 corresponding to the first feature set of a candidate answer.

Step 203 includes performing machine learning on the first input training data set to obtain a first mathematical model, which is used to compute a first confidence degree that the candidate answer is a correct answer based on the first feature set.

The first confidence degree is a predicted probability that the candidate answer is a correct answer. In training the first mathematical model M1, any existing machine learning algorithm, such as Decision Tree, Support Vector Machine, Bayes, Logistic Regression algorithm, etc., can be selected specifically. The specific training methods are well known to those skilled in the art and can be found in textbooks about machine learning, thus are not be described herein.

Step 204 includes computing first confidence degrees of the candidate answers of all the questions to be trained, and for each question, extracting a second feature set related to the first confidence degrees and the first feature set.

M1 is applied to the candidate answers of all the questions to be trained to determine a first confidence degree that each candidate answer is a correct answer. In order to facilitate the extraction of the second feature set, as an optional step, the candidate answers of each question to be trained can be sorted according to the first confidence degrees to obtain a candidate list, that is, while the collected candidate answer set is out of order, the candidate list obtained by sorting according to the first confidence degrees is in order.

The second feature set (F2) is directed to each question to be trained, having a one-to-one correspondence relationship with the each question. As an improvement of the present application, through the F2 features, considering the whole candidate answer set of each question, more clues as to whether a correct answer to the question than through F1 can be provided. Specifically, a second feature can be selected as a feature related to the first confidence degrees and as a feature related to the first feature set. In the following are shown some types of features in the second feature set (F2) and the meaning of these types of features:

F20: The maximum value of the first confidence degrees. The bigger value of this feature indicates the bigger probability that the candidate answer at the first place is correct, thus indicating indirectly the bigger probability of finding a correct answer to the question.

F21. The difference between the maximum value and the second maximum value of the first confidence degrees. The value of this feature is the difference between the first confidence degree values of the candidate answer at the first place and the candidate answer at the second place. A bigger value of this feature indicates a bigger difference between the best answer and the second best answer, and that the system can better distinguish between them, rather than mixing them up. Therefore, a bigger value of this feature may indicate a bigger probability of finding a correct answer to the question.

F22: The average of the first confidence degrees. A bigger/smaller value of this feature indicates a bigger/smaller probability that the candidate answers as a whole are correct, indirectly indicating the question being easier/the more difficult, thus indirectly indicating a bigger/smaller probability of finding a correct answer.

F23: The averages of some important features in the first feature sets.

F24: The standard deviations of some important features in the first feature sets.

In the first feature set (F1), there are also some important first features, which often afford great help in finding a correct answer, such as the feature about type matching degree (F10). Thus, the averages of these important features can reflect the overall reliability of the candidate answer set. And the standard deviation of these important features can reflect the dispersion degree of the feature values, with a bigger dispersion indicating that the difference between the candidate answers can be distinguished more easily, and that it is more probable to find a correct answer to the question. Identification of the important features in F1 can be performed based on the results of the first mathematic model, and existing machine learning algorithms provide approaches to identify important features. For example, in one embodiment, the Information Gain Index can be used to evaluate the importance degrees of feature values. Specific computing methods of this index can be found in text books about machine learning, and will not be described redundantly herein.

Of course, on the basis of the foregoing, those skilled in the art may contemplate other types of second features as alternative implementations.

Step 205 includes performing machine learning on a second input training data set formed by the second feature sets of the plurality of questions to be trained, to obtain a second mathematic model, which is used to compute a second confidence degree that the candidate answer is a correct answer based on the second feature set.

The second feature set (F2) of all the questions to be trained form the second input training data set (D2). With D2 as the input, an existing machine learning algorithm, such as the Decision Tree, Support Vector Machine, Bayers, etc., is used to obtain the second mathematic model for computing the second confidence degrees of the candidate answers.

Thus, through the two learning phases, two mathematic models M1 and M2 are obtained, and the machine learning method as shown in FIG. 2 can be performed either online or offline.

Figure 3:
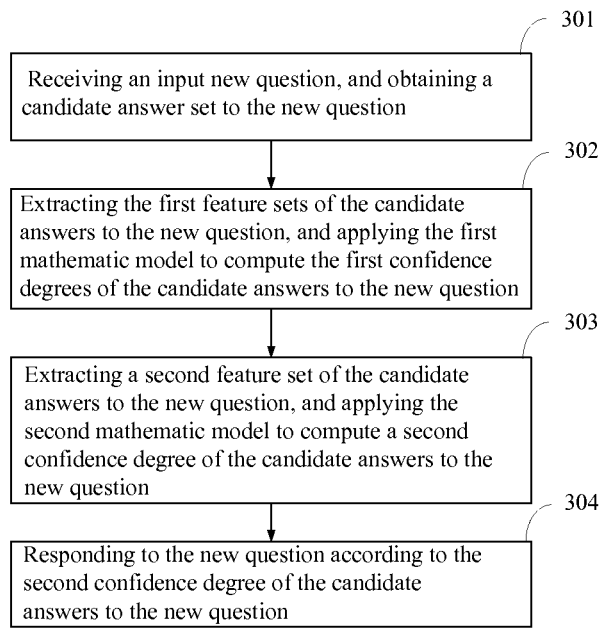
FIG. 3 illustrates a schematic working flow diagram of answering a new question.

FIG. 3 illustrates the steps of responding to a new question by applying the two mathematic models trained by the method shown in FIG. 2, including:

Step 301 includes receiving an input new question, and obtaining a candidate answer set to the new question.

In this step, for any input new question, a candidate answer generation algorithm the same as or different from that in the training phase is applied to generate a candidate answer set to the question.

Step 302 includes extracting the first feature sets of the candidate answers to the new question, and then applying the first mathematic model to compute the first confidence degrees of the candidate answers to the new question. The first feature sets in this step are the feature sets corresponding to the first mathematic model, that is, the selection of the first feature sets in this step needs to be consistent with the first feature sets determined in training the first mathematic model. Apparently, for a new question, it is unknown whether a candidate answer is correct, therefore the first feature set of a candidate answer will not include the information on whether the candidate answer is correct. As an optional step, before extracting the second feature set, the candidate answers to the question to be trained are sorted according to the first confidence degrees to obtain a sorted list of candidate answers for facilitating computing the F2 features.

Step 303 includes extracting a second feature set of the candidate answers to the new question, and applying the second mathematic model to compute a second confidence degree of the candidate answers to the new question. The second feature set in this step is the feature set corresponding to the second mathematic model, that is, the selection of the second feature set in this step needs to be consistent with the second feature set determined in training the second mathematic model. In one embodiment, as an optional step, before extracting the second feature set of the candidate answers to the new question, the candidate answers to the new question are sorted according to the first confidence degrees of the candidate answers to the new question, thus facilitating computing each feature values in the feature set F2 based on the sorted list of the candidate answers.

Step 304 includes responding to the new question according to the second confidence degree of the candidate answers to the new question.

In an embodiment of this step, the candidate answer with the biggest second confidence degree S' can be directly taken as the answer to the question.

Figure 4:
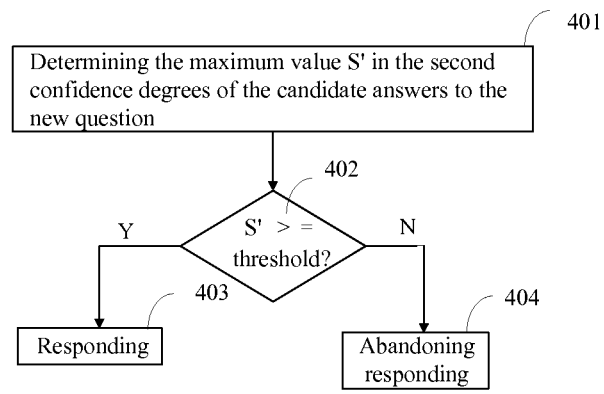
FIG. 4 illustrates an alternative implementation of step 304 in FIG. 3.

FIG. 4 illustrates another embodiment of step 304, including the following steps:

Step 401, determining the maximum value S' in the second confidence degrees of the candidate answers to the new question; and Step 402, in response to the maximum value in the second confidence degrees of the candidate answers to the new question exceeding a preset threshold, proceeding to step 403 to respond with the corresponding candidate answer; otherwise, proceeding to step 404 to abandon responding. The user can set the threshold based on the preferences of the actual application. For example, in an application with a high requirement for the accurateness of question-answering, a bigger threshold can be set.

In connection with the machine learning process as shown in FIG. 2, the present application also discloses a machine learning system for computer question-answering, including:

means configured to receive a plurality of questions to be trained, and obtain a candidate answer set to each question;

means configured to determine part of the questions to which the candidate answer sets include correct answers, and using first feature sets of the candidate answers to which the part of the questions correspond to form a first input training data set;

means configured to perform machine learning on the first input training data set to obtain a first mathematical model, which is used to compute first confidence degrees that the candidate answers are correct answers based on the first feature sets;

means configured to compute first confidence degrees of the candidate answers of all the questions to be trained, and for each question, extracting a second feature set related to the first confidence degrees and the first feature set; and means configured to perform machine learning on a second input training data set formed by the second feature sets of the plurality of questions to be trained, to obtain a second mathematic model, which is used to compute a second confidence degree that the candidate answer is a correct answer based on the second feature set.

In an implementation of the present invention, the first feature set includes one or more of the following features: the matching degree of the type of the candidate answer and the question to be trained; the literal similarity between the text around the candidate answer and the text of the question to be trained; the matching degree of the time feature of the candidate answer and the time appearing in the question to be trained; and the matching degree of the geographic location information of the candidate answer and the geographic location appearing in the question to be trained.

According to another implementation of the present invention, the first feature set further includes information about whether the candidate answer is a correct answer.

In an implementation of the present invention, the second feature set includes one or more of the following features: the maximum value of the first confidence degrees; the difference between the maximum value and the second maximum value of the first confidence degrees; the average of the first confidence degrees; the average of some important features in the first feature set; and the standard deviation of some important features in the first feature set.

In an implementation of the present invention, before extracting the second feature set, the candidate answers to the question to be trained are sorted according to the first confidence degrees.

In connection with the process of responding to a new question as shown in FIG. 3, the present invention further discloses a system for responding to a new question by applying the mathematic models obtained by the above machine learning system, including:

means configured to receive an input new question, and obtain a candidate answer set to the new question;

means configured to extract first feature sets of the candidate answers to the new question, and then apply the first mathematic model to compute first confidence degrees of the candidate answers to the new question;

means configured to extract second feature set of the candidate answers to the new question, and apply the second mathematic model to compute a second confidence degree of the candidate answers to the new question; and means configured to respond to the new question according to the second confidence degrees of the candidate answers to the new question.

In an implementation, the system for responding to a new question further includes: means configured to, before extracting the second feature set of the candidate answers to the new question, sort the candidate answers to the new question according to the first confidence degrees of the candidate answers to the new question.

In an implementation of the present invention, in the system for responding to a new question, the responding to the new question is: in response to the maximum value in the second confidence degrees of the candidate answers to the new question exceeding a preset threshold, respond with the corresponding candidate answer, otherwise, abandoning responding.

A specific embodiment of the machine learning method shown in FIG. 2 will now be described to illustrate the training process of the two mathematic models M1 and M2. In this embodiment, n questions to be trained (Q1-Qn) are received in total, and a candidate answer set to each question is obtained. For example, one of the questions is to ask "Who invented the electric bulb?" Referring to Table 2, the candidate answer set to this question has 3 candidate answers.

Next, part of the questions (G1) to which the candidate answer sets include correct answers are determined from the n questions to be trained. Taking Qi as example, as shown in Table 2, the candidate answer set to Qi include the correct answer, therefore Qi should be a question belonging to G1 set. In the training phase, in addition to Qi, G1 may further include other questions to be trained which satisfy the above condition, for example, Q1, Qj, etc.

TABLE 2

| Qi | F10 | F11 | F12 | F13 | F14 | Correct or not |
|---|---|---|---|---|---|---|
| Alexander | 0.8 | 0.1 | 0.3 | 0.1 | 0 | No |
| Edison | 0.9 | 0.8 | 0.9 | 0.8 | 0 | Yes |
| Newton | 0.8 | 0.5 | 0.7 | 0.6 | 0 | No |

In this embodiment, the first feature set F1 of each candidate answer includes F10, F11, F12, F13, F14 and information about whether the candidate answer is a correct answer, wherein the feature set F1 includes the types of features as follows:

F10: the matching degree of the type of the candidate answer and the question to be trained;

F11: the literal similarity between the text around the candidate answer and the text of the question to be trained;

F12: the similarity score of the candidate answer obtained in the searching results;

F13: the matching degree of the time feature of the candidate answer and the time appearing in the question to be trained; and F14: the matching degree of the geographic location of the candidate answer and the geographic location appearing in the question to be trained.

For the other questions in the G1 set, such as Q1, Qj, the candidate answer sets and the feature sets F1 to which the candidate answer sets correspond can all be obtained in the same manner as shown in Table 2.

TABLE 3

| G1 | F10 | F11 | F12 | F13 | F14 | Correct or not |
|---|---|---|---|---|---|---|
| One of the candidate answers of Q1 | ... | ... | ... | ... | ... | ... |
| ... | ... | ... | ... | ... | ... | ... |
| Alexander | 0.8 | 0.1 | 0.3 | 0.1 | 0 | No |
| Edison | 0.9 | 0.8 | 0.9 | 0.8 | 0 | Yes |
| Newton | 0.8 | 0.5 | 0.7 | 0.6 | 0 | No |
| ... | ... | ... | ... | ... | ... | ... |
| On of the candidate answers of Qj | ... | ... | ... | ... | ... | ... |
| ... | ... | ... | ... | ... | ... | ... |

Finally, as shown in Table 3, the first feature sets of all the candidate answers of all the questions in G1 group are combined together to form the first input training dataset D1 for the machine learning algorithm.

Then, machine learning is performed on D1 to get the first mathematic model (M1), which is used to compute the first confidence degree of a candidate answer according to the F1 features. In this embodiment, after performing machine learning on D1 using the logistic regression algorithm, the first mathematic model M1 in the following form is obtained:

$$P1=1/(1+\exp(w0*F10+w1*F11+w2*F12+w3*F13+w4*F14))$$

in which, w0, w1, w2, w3 and w4 are trained weights, and p is the first confidence degree (predicted probability) that the candidate answer is a correct answer.

TABLE 4

| Q1 | F10 | F11 | F12 | F13 | F14 | Confidence degree | Correct or not |
|---|---|---|---|---|---|---|---|
| Edison | 0.9 | 0.8 | 0.9 | 0.8 | 0 | 0.8 | Yes |
| Newton | 0.8 | 0.5 | 0.7 | 0.6 | 0 | 0.3 | No |
| Alexander | 0.5 | 0.1 | 0.3 | 0.1 | 0 | 0.2 | No |

Further, M1 is applied to the candidate answers of all the questions Q1-Qn to get the first confidence degree that each candidate answer is a correct answer. Referring to Table 4, it shows the computed first confidence degrees of the candidate answers of question Qi, and it further shows the sorted list of the candidate answers obtained by sorting the candidate answers under each question according to the first confidence degrees.

Then, for each question, a second feature set (F2) related to the first confidence degrees and the first feature sets of its candidate answers is extracted. In this embodiment, the F2 feature set of a question to be trained includes the following features (within the parenthesis is the F2 feature of the question Qi to be trained):

the maximum value of the first confidence degrees (F20=0.8);

the difference between the maximum value and the second maximum value of the first confidence degrees (F21=0.8−0.3=0.5);

the average of the first confidence degrees (F22=(0.8+0.3+0.2)/3=0.043);

the average of some important feature (e.g., F10) in the first feature sets (F23=(0.9+0.8+0.5)/3=0.733);

the standard deviation of some important feature (e.g., F10) in the first feature sets $$(F24=\mathrm{sqrt}(((0.9-0.733)^2+(0.8-0.733)^2+(0.5-0.733)^2)/3)=0.167);$$

thereby, the second feature set of the question Qi to be trained is obtained: F2 (Qi):<0.8, 0.5, 0.043, 0.733, 0.167>.

Since the computation of the second feature set is directed to all the questions Q1-Qn to be trained, the second feature sets of the other questions to be trained, such as F2 (Q1), F2 (Qj) and F2 (Qn) need to be computed as well. Then, the second feature sets of all the questions to be trained form a second input trained data set (D2) as follows:

F2 (Q1): < ..., ..., ..., ..., ... >

F2 (Qi): < 0.8, 0.5, 0.043, 0.733, 0.167 >

...

F2 (Qj): < ..., ..., ..., ..., ... >

...

F2 (Qn): < ..., ..., ..., ..., ... >

Finally, taking D2 as the input, using an existing machine learning algorithm, such as the Decision Tree, Support Vector Machine, Bayes, etc., a second mathematic model M2 is obtained. In this embodiment, the logistic regression algorithm can be used also to obtain the second mathematic model M2 in the following form:

$$P2=1/(1+\exp(y0*F20+y1*F21+y2*F22+y3*F23+y4*F24))$$

in which, y0, y1, y2, y3 and y4 are trained weights, and P2 is a second confidence degree that the candidate answer is a correct answer as computed according to the second feature set.

In the process of responding to a new question according to the two mathematic models M1 and M2, first a candidate answer set to this new problem can be obtained using the above steps, and then, the first feature sets of the candidate answers to the new question can be extracted, and the first mathematic model obtained can be applied to compute the first confidence degrees of the candidate answers to the new question; then, the second feature set of the candidate answers to the new question can be extracted, and the second mathematic model can be applied to compute the second confidence degree of the candidate answers to the new question; and finally, the new question is responded to according to the second confidence degrees of the candidate answers to the new question.

Using the technical solution of the present invention can remove the unnecessary restraint enforced by the questions with no correct answers in obtaining the first mathematic model to make the training data more balanced. And applying the second mathematic model trained using the second feature sets can facilitate improving answering to the new question.

The method and system for computer question-answering according to embodiments of the present invention have been described above with reference to the Figures. It is to be noted that the above description is only for example, rather than limiting the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A machine learning method for computer question-answering, comprising:

receiving a plurality of questions to be trained, and obtaining a candidate answer set for each of said questions;

determining a part of said questions to which said candidate answer sets include correct answers, and using first feature sets of said candidate answers to which said part of said questions correspond to form a first input training data set, wherein said first feature sets comprises at least one of:

a matching degree of a type of said candidate answer and said question to be trained;

a literal similarity between the text around said candidate answer and the text of said question to be trained;

a matching degree of a time feature of said candidate answer and the time appearing in said question to be trained; and a matching degree of a geographic location of said candidate answer and a geographic location appearing in said question to be trained;

performing machine learning on said first input training data set to obtain a first mathematical model, and using said first mathematical model to compute a first confidence degree that said candidate answer is a correct answer based on said first feature set;

computing first confidence degrees of said candidate answers of all of said questions to be trained, and for each question, extracting a second feature set related to said first confidence degrees and said first feature set; and performing machine learning on a second input training data set formed by said second feature sets of said plurality of questions to be trained, to obtain a second mathematic model, and using said second mathematical model to compute a second confidence degree that said candidate answer is a correct answer based on said second feature set.

2. The method according to claim 1, wherein said first feature set further comprises information about whether said candidate answer is a correct answer.

3. The method according to claim 1, wherein said second feature set comprises at least one of:

a maximum value of said first confidence degrees;

a difference between said maximum value and a second maximum value of said first confidence degrees;

an average of said first confidence degrees;

an average of an important feature in said first feature set; and a standard deviation of an important feature in said first feature set.

4. The method according to claim 1, wherein, before extracting said second feature set, said candidate answers to said question to be trained are sorted according to said first confidence degrees.

5. A method for responding to a new question, comprising:

receiving a new question, and obtaining a candidate answer set to said new question;

determining a part of said new question to which said candidate answer set includes correct answers, and using first feature sets of said candidate answers to which said part of said questions correspond to form a first input training data set;

performing machine learning on said first input training data set to obtain a first mathematical model, and using said first mathematical model to compute a first confidence degree that said candidate answer is a correct answer based on said first feature set;

computing first confidence degrees of said candidate answer of said new question, and for said new question, extracting a second feature set related to said first confidence degree and said first feature set;

performing machine learning on a second input training data set formed by said second feature set of said new question, to obtain a second mathematical model, and using said second mathematical model to compute a second confidence degree that said candidate answer is a correct answer based on said second feature set;

in response to a maximum value in said second confidence degree of said candidate answers to said new question exceeding a preset threshold, responding to said new question according to said second confidence degree of said candidate answers to said new question; and in response to a maximum value in said second confidence degree of said candidate answers to said new question failing to exceeding said preset threshold, abandoning responding.

6. The method according to claim 5, wherein, before extracting said second feature set of said candidate answers to said new question, sorting said candidate answers to said new question according to said first confidence degrees of said candidate answers to said new question.

7. A machine learning system for computer question-answering, comprising:

means configured to receive a plurality of questions to be trained, and obtain a candidate answer set for each question;

means configured to determine a part of said questions to which said candidate answer sets include correct answers, and use first feature sets of said candidate answers to which said part of said questions correspond to form a first input training data set, wherein said first feature sets comprises at least one of:

a matching degree of a type of said candidate answer and said question to be trained;

a literal similarity between the text around said candidate answer and the text of said question to be trained;

a matching degree of a time feature of said candidate answer and the time appearing in said question to be trained; and a matching degree of a geographic location of said candidate answer and a geographic location appearing in said question to be trained;

means configured to perform machine learning on said first input training data set to obtain a first mathematical model, and use said first mathematical model to compute a first confidence degree that said candidate answer is a correct answer based on said first feature set;

means configured to compute first confidence degrees of said candidate answers of all of said questions to be trained, and for each question, extracting a second feature set related to said first confidence degrees and said first feature set; and means configured to perform machine learning on a second input training data set formed by said second feature sets of said plurality of questions to be trained, to obtain a second mathematic model, which is used to compute a second confidence degree that said candidate answer is a correct answer based on said second feature set.

8. The machine learning system according to claim 7, wherein said first feature set further comprises information about whether said candidate answer is a correct answer.

9. The machine learning system according to claim 7, wherein said second feature set comprises one or more of:
- a maximum value of said first confidence degrees;
- a difference between said maximum value and a second maximum value of said first confidence degrees;
- an average of said first confidence degrees;
- an average of an important feature in said first feature set; and
- a standard deviation of an important feature in said first feature set.

10. The machine learning system according to claim 7, wherein, before extracting said second feature set, said candidate answers to said question to be trained are sorted according to said first confidence degrees.

11. A system for responding to a new question, comprising:
- means configured to receive a new question, and obtain a candidate answer set to said new question;
- means configured to determine a part of said new question to which said candidate answer set includes correct answers, and use a first feature set of said candidate answers to which said part of said new question corresponds to form a first input training data set;
- means configured to perform machine learning on said first input training data set to obtain a first mathematical model, and use said first mathematical model to compute a first confidence degree that said candidate answer is a correct answer based on said first feature set;
- means configured to compute first confidence degrees of said candidate answers of all said new question, and for said new question, extracting a second feature set related to said first confidence degrees and said first feature set;
- means configured to perform machine learning on a second input training data set formed by said second feature sets of said new question, to obtain a second mathematical model, which is used to compute a second confidence degree that said candidate answer is a correct answer based on said second feature set;
- in response to a maximum value in said second confidence degree of said candidate answers to said new question exceeding a preset threshold, means configured to respond to said new question according to said second confidence degree of said candidate answers to said new question; and
- in response to a maximum value in said second confidence degree of said candidate answers to said new question failing to exceed said preset threshold, abandoning responding.

12. The system for responding to a new question according to claim 11, further comprising: means configured to, before extracting said second feature set of said candidate answers to said new question, sort said candidate answers to said new question according to said first confidence degrees of said candidate answers to said new question.

* * * * *